Nov. 18, 1958  O. H. BANKER  2,860,605
POWER STEERING VALVE
Filed Dec. 30, 1953  4 Sheets-Sheet 2

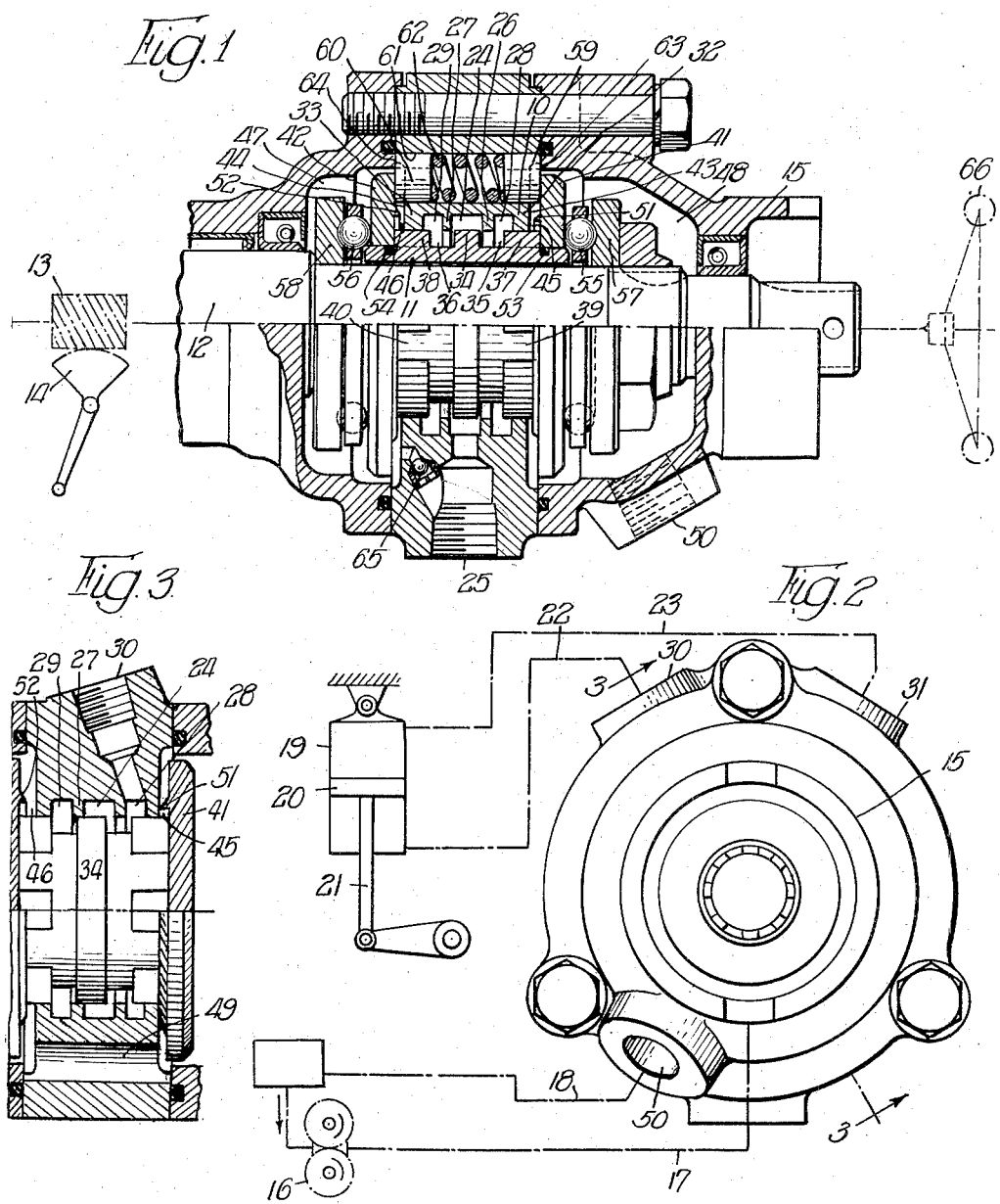

Inventor:
Oscar H. Banker
By Cromwell, Grist & Warden
Attys.

Inventor:
Oscar H. Banker,
By Cromwell, Greist & Warden
Attys.

Nov. 18, 1958      O. H. BANKER      2,860,605
POWER STEERING VALVE
Filed Dec. 30, 1953      4 Sheets-Sheet 4
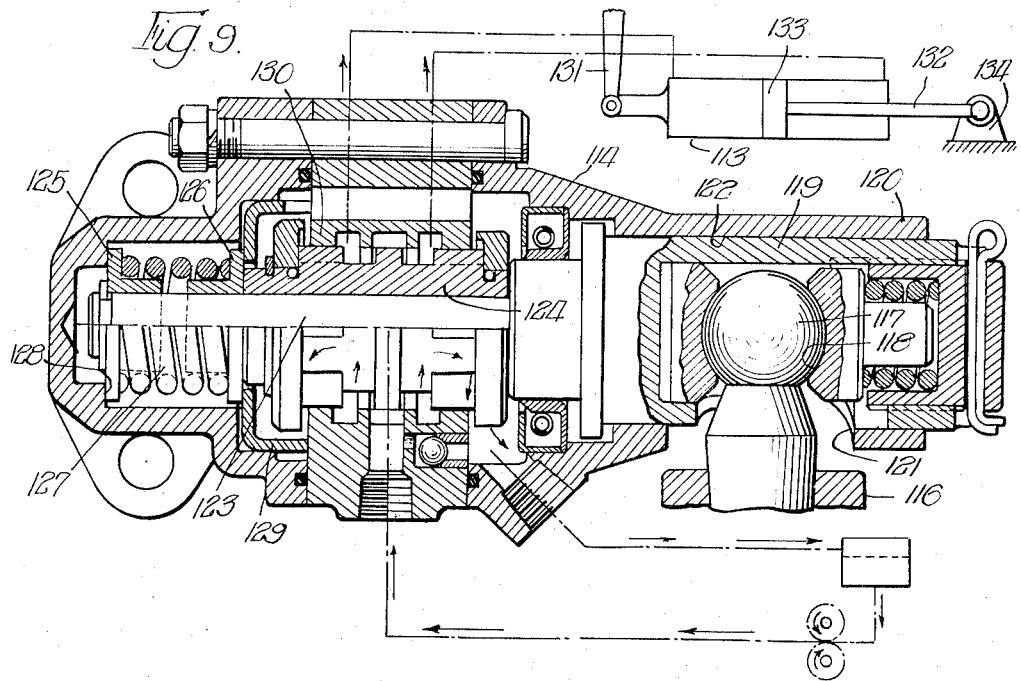
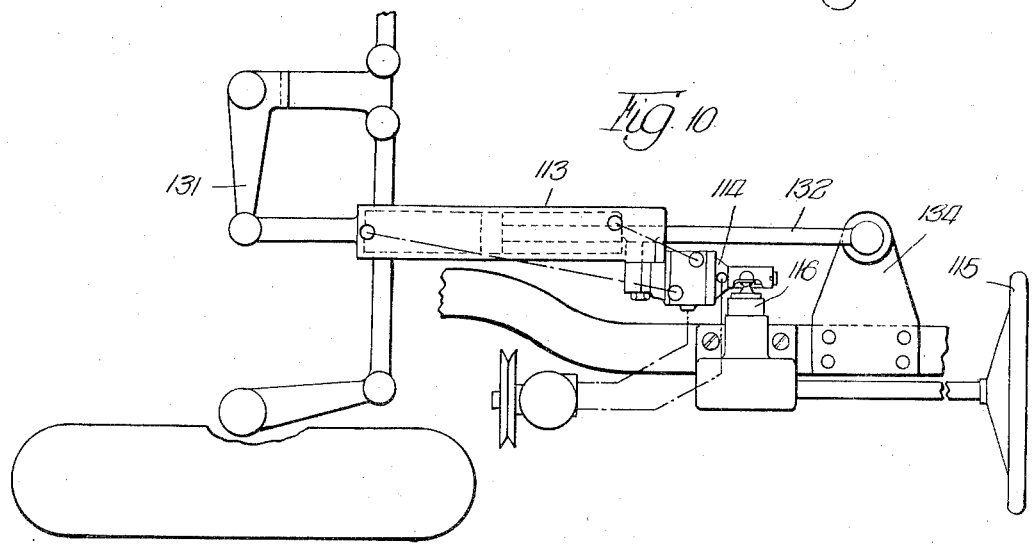
Inventor
Oscar H. Banker;
By Cromwell, Greist & Warden
attys United States Patent Office 2,860,605
Patented Nov. 18, 1958

2,860,605

POWER STEERING VALVE

Oscar H. Banker, Evanston, Ill., assignor to New Products Corporation, Chicago, Ill., a corporation of Delaware Application December 30, 1953, Serial No. 401,122

9 Claims. (Cl. 121—46.5)

This invention has to do with power steering valves of the type adapted for use in automotive vehicles.

One of the objects of the invention is to provide a new and improved power steering valve which is so constructed as to utilize the pressure of the fluid in the system to give the desired feel to the steering wheel while the latter is being turned.

Another object of the invention is to provide a new and improved power steering valve which is so constructed as to utilize the pressure of the fluid in the system to assist in returning the valve to its neutral position.

Another object of the invention is to provide a new and improved power steering valve which is so constructed as not to interfere in its operation with the self-recovery action inherent in the steering gear.

Another object of the invention is to provide a new and improved power steering valve in which over-travel of the valve, with consequent over-steering of the vehicle, is prevented.

Still another object of the invention is to provide a new and improved valve in which the number of surfaces required to seal against the pressure of the fluid in the system is reduced to a minimum.

A further object of the invention is to provide a new and improved valve in which differences in the effective pressure areas in the opposite ends of a power cylinder, caused by the presence in one end of the cylinder of a rod which is connected with the piston in the cylinder, are equalized in the operation of the valve.

While the foregoing statements are indicative in a general way of the nature and objects of the invention other objects and advantages will be apparent to those skilled in the art upon a full understanding of the construction, arrangement and operation of the valve.

A few embodiments of the invention are presented herein by way of exemplification but it will of course be appreciated that the invention is susceptible of incorporation in still other forms coming equally within the spirit of the invention and the scope of the appended claims.

In the accompanying drawings:

Fig. 1 is a longitudinal sectional view through a power steering valve constructed in accordance with the invention, showing the valve in its neutral position;

Fig. 2 is an end view of the valve, viewed from the right hand end of Fig. 1, showing schematically the connections of the valve with the hydraulic cylinder and with the high and low pressure sides of the pump;

Fig. 3 is a fragmentary longitudinal section through the valve, taken on a plane different from that of Fig. 1, namely, on the line 3—3 of Fig. 2, showing the valve in one of its two operating positions;

Fig. 9 shows in longitudinal section a modified application of the valve shown in Figs. 1 to 3, inclusive; and Fig. 10 is a schematic plan view of a steering mechanism which includes the embodiment shown in Fig. 9.

Figure 4:
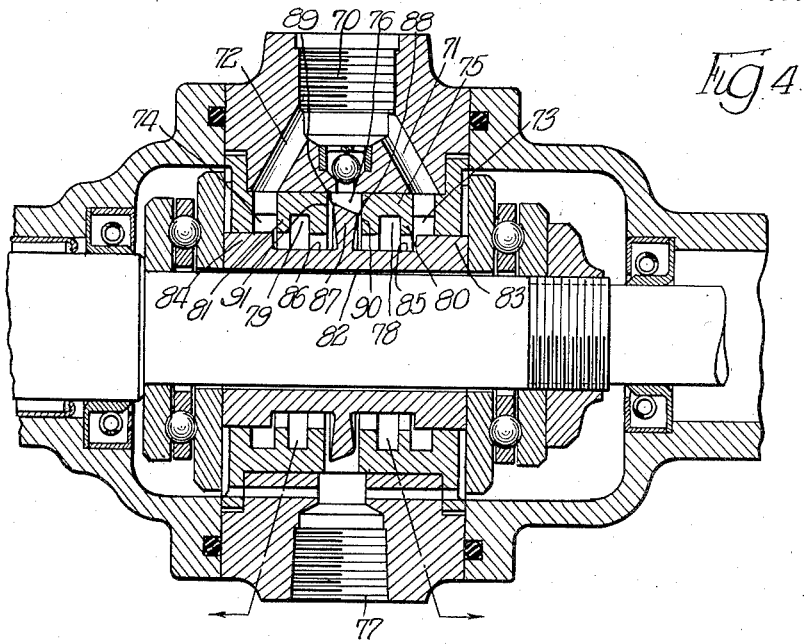
Figs. 4, 5 and 6 show in longitudinal section three modifications of the invention.

Describing first the form of the invention shown in Figs. 1 to 3, inclusive, it will be observed that the new valve includes primarily an elongated sleeve 10 and an elongated core 11 which is shiftable axially within the sleeve 10. The core 11 is carried by the worm shaft 12 of a steering mechanism, which mechanism includes the usual worm 13 and worm wheel 14, while the sleeve 10 is secured in a casing 15 which surrounds the shaft 12 at the location of the core 11. The sleeve 10 is stationary, while the core 11 is shiftable axially with the shaft 12.

The valve is adapted for connection with the high and low pressure sides of a pump 16, by means of conduits 17 and 18, and is adapted for connection with the opposite ends of a power cylinder 19 in which a piston 20 operates a rod 21, by means of conduits 22 and 23, all as shown schematically in Fig. 2.

The sleeve 10 is provided midway between its ends with an inwardly opening annular channel 24, which channel communicates with a radial port 25 which is adapted for connection with the conduit 17 leading from the high pressure side of the pump 16. At the sides of the high pressure channel 24 the sleeve 10 is provided with a pair of relatively narrow cylindrical lands 26 and 27, and at the far sides of the lands 26 and 27 the sleeve is provided with a pair of inwardly opening annular channels 28 and 29. The channel 28 communicates with a radial port 30 which is adapted for connection with the conduit 22 leading to the piston-rod end of the cylinder 19, while the channel 29 communicates with a radial port 31 which is adapted for connection with the conduit 23 leading to the other end of the cylinder 19. Beyond the channels 28 and 29 the sleeve 10 is provided at the ends thereof with a pair of cylindrical lands 32 and 33 of the same diameter as the lands 26 and 27, which end lands constitute guide bearings for cooperation with complementary guide bearings provided on the core 11 adjacent the ends of the latter.

The core 11 is provided midway between its ends with a cylindrical land 34 of the same diameter as the lands 26 and 27 in the sleeve 10, for fluid-tight telescopic association with either of those lands. The land 34 in the core is located opposite the high pressure channel 24 in the sleeve 10, is of less axial extent than that channel, and is, in the neutral position of the core, which position is shown in Fig. 1, spaced axially from both the land 26 and the land 27. At the sides of the land 34 the core 11 is provided with a pair of outwardly opening annular channels 35 and 36, which channels are located opposite the lands 26 and 27 in the sleeve and also opposite portions of the channels 28 and 29 in the sleeve. The channels 35 and 36 are of greater axial extent than the lands 26 and 27 in the sleeve and communicate at all times with the channels 28 and 29 in the sleeve. Beyond the channels 35 and 36 the core 11 is provided adjacent the ends thereof with a pair of cylindrical lands 37 and 38, which lands are the same diameter as the lands 32 and 33 at the ends of the sleeve 10 and constitute guide bearings for freely movable, axially shiftable coaction with the lands 32 and 33.

The lands 37 and 38 on the core 11 are provided at circumferentially spaced intervals with axially extending slots 39 and 40 for a purpose which will shortly be explained.

The core 11 is somewhat longer than the sleeve 10 in which it operates and is provided beyond the ends of the sleeve 10 with a pair of radially disposed disks 41 and 42, which disks confront the end faces 43 and 44 of the sleeve 10 and are both spaced axially from such end faces in the neutral position of the valve. The disks 41 and 42 form with the end faces 43 and 44 of the sleeve 10 a pair of valvate formations for controlling the opening and closing of a pair of annular passages 45 and 46 beyond the ends of the sleeve 10. These passages 45 and 46, which communicate respectively with the annular channels 35 and 36 in the core 11 by way of the cross slots 39 and 40, open outwardly into chambers 47 and 48 in the casing 15. The chamber 47 is connected with the chamber 48 by an axially extending bore 49 in the outer portion of the sleeve 10, and the chamber 48 is in turn connected with the conduit 18 leading to the low pressure side of the pump 16 by a port 50 in the casing 15 at the location of the chamber 48.

The annular passages 45 and 46 are in this way both connected with the low pressure side of the pump. As one of the passages opens the other closes, and vice versa.

The disks 41 and 42 are provided with annular ribs 51 and 52 which project toward the end faces 43 and 44 of the sleeve 10, partially across the passages 45 and 46, the ribs forming cup-shaped pockets in the outer sides of the passages 45 and 46. The ribs 51 and 52 preferably terminate in sharp edges for narrow, more or less line contact abutment with the end faces 43 and 44 of the sleeve 10 when moved axially into engagement with such end faces. The rib 51 is preferably smaller and of less effective diameter than the rib 52, for a purpose which will be later explained.

The disks 41 and 42, instead of being rigidly secured to the core 11, are preferably tiltably mounted on the core in order to be able to adjust themselves accurately to the planes of the end faces 43 and 44 of the sleeve 10 when moved into passage-closing abutment with the latter, the disks being sealed with respect to the core by O-rings 53 and 54 or other suitable means. The disks 41 and 42 are held in sealed position on the ends of the core 11, and the core 11 is in turn held against endwise movement relative to the shaft 12, by end-thrust bearings 55 and 56, which bearings are disposed between the disks and collars 57 and 58 on the shaft 12 beyond the ends of the core 11. The core 11 is supported in centered relation by the sleeve 10, preferably in slightly spaced relation to the shaft 12, the bearings 55 and 56 permitting the core to remain stationary with the sleeve when the shaft turns.

The disks 41 and 42 extend outwardly some distance beyond the ribs 51 and 52 on the disks and engage respectively with the ends of plungers 59 and 60, which plungers are slidably mounted in an axial bore 61 in the outer portion of the sleeve 10 and are separated axially from each other by a compressed spring 62. The spring 62 urges the plungers 59 and 60 resiliently against limiting shoulders 63 and 64 in the casing 15. While only one spring and plunger assembly is shown, three or more such assemblies are preferably provided, equally spaced circumferentially about the center of the valve. These spring and plunger assemblies act through the disks 41 and 42 to yieldingly resist axial movement of the core 11 in either direction and serve to aid in returning the core 11 to its neutral position.

The low pressure side of the system is preferably connected, within the valve, with the high pressure side by a check valve 65, which check valve may be located within the inlet port 25 between that port and the chamber 47. The pressure of the fluid in the inlet port 25 is under all normal conditions sufficient to keep the check valve 65 closed, but in the event that the pressure of the fluid in the low pressure side should for any reason exceed that in the high pressure side the check valve 65 will open. This condition would occur only when the flow of the fluid from the pump is for any reason interrupted and the vehicle needs to be started manually without interference from the cylinder.

The valve shown in Figs. 1 to 3, inclusive, operates as follows:

In straight driving the core 11 of the valve assumes the centered position shown in Fig. 1, which position is its neutral position. In that position of the core 11 both the high and low pressure sides of the pump are in communication with both ends of the power cylinder 19 and the liquid circulates in the system without any effect on the piston 20 in the cylinder 19. When the operator wishes to steer the vehicle to say the right, the initial turning movement which he imparts to the steering wheel 66 (which is illustrated at the right hand side of Fig. 1 mounted on an extension of the shaft 12) is transmitted through the shaft 12 to the worm 13, and the resistance offered by the worm wheel 14, because of its connection through the usual steering linkage with the ground wheels of the vehicle, results in the worm 13, and consequently the core 11, being shifted axially a short distance to the left, from the position shown in Fig. 1 into the position shown in Fig. 3.

When this occurs the land 34 on the core moves immediately into fluid-tight telescopic association with the land 27 in the sleeve, thereby cutting off entirely communication between the high pressure side of the pump and the channel 29 connected with one of the ends of the cylinder and placing the channel 29 and consequently the same end of the cylinder in fully open communication with the low pressure side of the pump through the passageway 46. While this takes place the channel 28 connected with the other end of the cylinder is simultaneously placed in full and unrestricted communication with the high pressure side of the pump and that end of the cylinder is at the same time gradually and progressively cut off from communication with the low pressure side of the pump as the rib 51 on the disk 41 acts to pinch off the passageway 45 between that disk and the confronting end of the sleeve 10.

The rate of flow of the fluid under pressure into the first mentioned end of the cylinder will depend upon the rapidity and extent to which the core 11 moves to the left, and this in turn will of course depend upon the speed and force with which the operator turns the wheel. The movement of the wheel by the operator will be yieldingly resisted not only by the springs 62 but also by the pressure of the liquid as it is trapped off by the pocket-forming rib 51 as it passes through the passageway 45.

As long as the operator continues to apply force to turn the wheel to the right the core 11 will remain shifted to the left, but as soon as the operator stops turning the wheel the core 11 will be returned by the springs 62, assisted by the pressure of the liquid pocketed inwardly of the rib 51, to its neutral position and the travel of the piston in the cylinder will be stopped.

When the wheel is turned to the left the valve will of course operate in the other direction, directing the high pressure fluid into the other end of the cylinder.

The piston 20 moves at substantially the same speed in either direction during the turning of the vehicle notwithstanding the reduced area of the cylinder in the piston-rod end of the latter caused by the presence of the rod 21.

In power steering it is desirable that the amount of force which the driver is required to use in turning the wheel be substantially the same regardless of the direction in which the wheel is turned. Since, in a power cylinder of the type disclosed in this application, in which the piston operates through a rod which extends through one end of the cylinder, the effective area in the rod end is less than that in the other or plain end, a higher pressure per square inch is required in the rod end than in the plain end in order to develop the same thrust on the piston in either direction. Were this difference not compensated for in the construction of the valve the wheel would be harder to turn in one direction than in the other. In the present valve this problem has been overcome in a simple yet highly effective manner by making the back pressure areas of the disks 41 and 42, as constituted by the pocketing formations within the ribs 51 and 52, of different sizes and in such proportions relative to each other as to result in the required pull on the wheel being the same in both directions.

With the new valve self-recovery of the steering mechanism after turns will take place in the same way as in ordinary manual steering and will not be interfered with by either the power cylinder or the valve. The cylinder is able to exhaust freely in either direction because of the fact that when the valve returns to its neutral position, which it will do immediately upon pull on the wheel being released, both ends of the cylinder will be connected more or less directly with the low pressure side of the pump free from all interference from the high pressure side.

In the valve shown in Fig. 4 the fluid from the high pressure side of the pump enters through a port 70 and through branches 71 and 72 of that port into a pair of widely spaced high pressure channels 73 and 74 in the sleeve 75 adjacent the ends of the latter. The sleeve 75 is provided at its center with a radially enlarged low pressure channel 76 which communicates with the low pressure side of the pump through a port 77. Between the side channels 73 and 74 and the center channel 76 the sleeve 75 is provided with another pair of channels 78 and 79, the channel 78 communicating with the piston-rod end of the hydraulic cylinder and the channel 79 communicating with the other end of the cylinder. Between the channels 73 and 74 and the channels 78 and 79 the sleeve 75 is provided with lands 80 and 71.

The core 82, which fits slidably within the sleeve 75, is provided adjacent its ends with a pair of lands 83 and 84 which are movable into sealed relationship with the lands 80 and 81 in the sleeve, with a pair of relatively wide channels 85 and 86 inwardly of the lands 83 and 84, and with a radially enlarged flange 87 between the channels 85 and 86, which flange projects into the channel 76 in the sleeve 75. The sides 88 and 89 of the flange 87 are adapted to move axially into sealed abutment respectively with the side walls 90 and 91 of the channel 76, and the sides 88 and 89 of the flange are undercut as shown and of different effective diameters, the small diameter side 88 being located adjacent the channel 78 leading to the piston-rod end of the cylinder and the large diameter side 89 being located adjacent the channel 79 leading to the other end of the cylinder.

When the core 83 of the valve shown in Fig. 4 is shifted in either direction the flange 87 on the core will act to progressively pinch off and pocket the fluid previously flowing to the low pressure side of the system from the end of the cylinder which is being placed in communication with the high pressure side of the system, giving the same effect as that obtainable with the valve shown in Figs. 1 to 3, inclusive.

Figure 5:
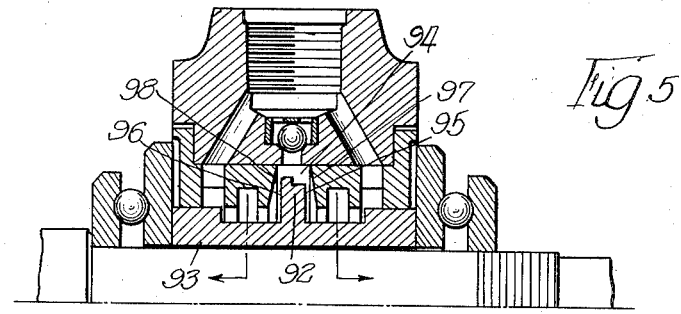

The valve shown in Fig. 5 is substantially the same in construction and operation as that shown in Fig. 4 except that in the valve of Fig. 5 the radially extending flange 92 at the center of the core 93, instead of having its sides undercut to produce the desired line-contact abutment with the sides of the return channel 94, has straight sides 95 and 96, of different radial dimensions, and the side walls 97 and 98 of the return channel 94 are of conical form to obtain the same effect.

Figure 6:
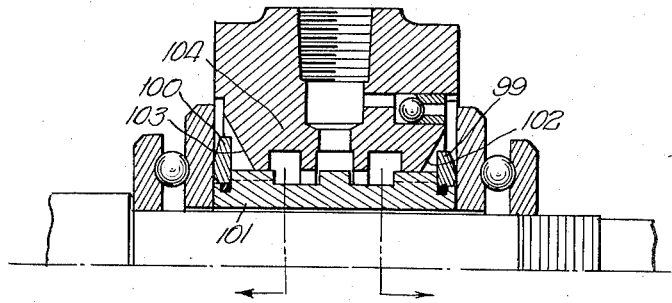

The modification shown in Fig. 6 is more like that shown in Figs. 1 to 3, inclusive, the principal difference being that the inner faces of the end disks 99 and 100 on the core 101 are straight and of different diameters while the end faces 102 and 103 of the sleeve 104 are coned to pocket off the flow of the fluid past the outer knife-like edges of the disks 99 and 100.

Figure 7:
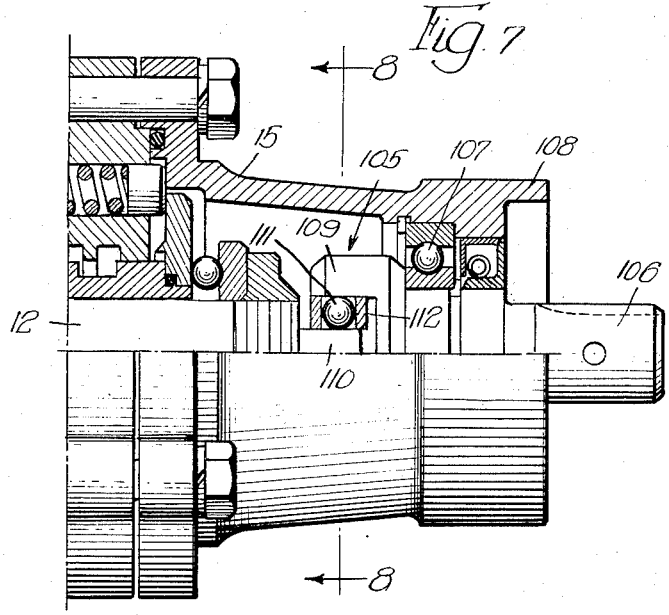
Fig. 7 shows fragmentarily a special shaft coupling incorporated with the form of the valve shown in Figs. 1 to 3, inclusive.
Figure 8:
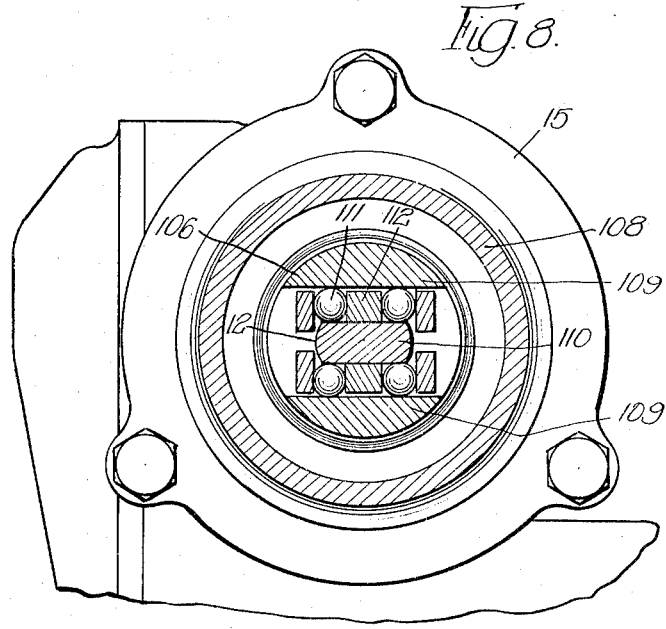
Fig. 8 is a transverse sectional view through the shaft coupling, taken on the line 8—8 of Fig. 7.

In Figs. 7 and 8 the valve of Figs. 1 to 3, inclusive, is shown equipped with a special coupling 105 between the worm shaft 12 and a shaft 106 which is in turn connected with the steering wheel.

The shaft 106, which is journaled in bearings 107 in an extension 108 of the casing 15 in concentric relation to the shaft 12, is provided with a bifurcated end portion 109 which fits telescopically and non-rotatably about a flattened end portion 110 of the shaft 12. The shaft 106, while free to rotate with the wheel, is held against axial movement by the bearings 107, and the flattened end portion 110 of the shaft 12 is shiftable axially within the bifurcated end portion 109 of the shaft 106 but is prevented from turning relative to the same by interposed bearings 111 housed in a suitable cage 112, the bearings 111 permitting free endwise movement of the shaft 12 with respect to the shaft 106, even under heavy torque. The bearings 111, being fitted in place under pre-load, also eliminate all possibility of back lash between the shafts.

This special shaft coupling obviates the necessity of any up-and-down movement of the wheel without interfering in any way with the action of the valve itself.

In all of the forms described it will be appreciated that all possibility of over-travel of the valve parts is entirely eliminated because of the fact that the axially confronting valvate formations which control the flow of the fluid back to the low pressure side of the system can do no more in closing than come together with what might be termed a kissing action, with the result that the power cylinder responds immediately to the slightest axial movement of the valve parts.

In the modification shown in Figs. 9 and 10 the new valve, instead of being mounted on the steering column as in the previously described embodiments, is mounted on one side of the hydraulic cylinder 113 in a separate casing 114 and moves bodily with the cylinder.

In this modification the steering wheel 115 operates the usual pitman 116 back and forth through the usual worm or other mechanism, and the ball end 117 of the pitman extends into a complementary socket 118 which is located in one end of a shaft 119 in the valve casing 114, the casing 114 being provided with a tubular extension 120 which contains an opening 121 in the side of the same through which the pitman 116 extends. The shaft 119 is supported for axial movement within a cylindrical bore 122 in the extension 120, and has a reduced end portion 123 in the valve casing proper about which the valve is positioned.

The valve is of substantially the same construction as that shown in Figs. 1 to 3, inclusive, and operates in the same manner. The core 124 of the valve is press-fitted or otherwise fixedly secured to the end portion 123 of the shaft, and beyond the core 124 a pair of flanged collars 125 and 126 are slidably mounted on the end portion 123, in engagement with the opposite ends of a coil spring 127. The collar 125 abuts against a shoulder 128 in the casing 114, while the collar 126 abuts against a cage 129 which in turn abuts against the adjacent end of the sleeve 130 of the valve. This spring and collar assembly serves to return the core 124 to its neutral position and takes the place of the spring and plunger assemblies used in the embodiment shown in Figs. 1 to 3, inclusive. The core 124 cooperates with the sleeve 130 to control the various fluid passages in the valve in the same way as in the embodiment shown in Figs. 1 to 3, inclusive.

One end of the cylinder 113 is connected directly to an arm 131 which moves the steering gear, and the rod 132 of the piston 133 in the cylinder 113 is anchored at its far end to a bracket 134 on the chassis of the vehicle. When the fluid from the high pressure side of the pump is directed into the piston rod end of the cylinder the cylinder will be moved bodily to the right, and when the liquid from the high pressure side of the pump is directed into the full or plain end of the cylinder the cylinder will be moved bodily to the left.

When the steering wheel 115 is turned, say to the left, the ball and socket connection at the end of the pitman 116 will first shift the shaft 119 a short distance to the left against the resistance offered by the spring 127, with the end of the reduced portion 123 of the shaft 119 sliding through the then stationarily held collar 125. This movement of the shaft 119 will in turn move the core 124 of the valve to the left relative to the sleeve 130 of the valve, thereby connecting the piston rod end of the cylinder 113 with the high pressure side of the pump and causing the cylinder 113 to move bodily to the right. When the steering wheel is turned in the other direction the action of the valve will be reversed, causing the cylinder 113 to move to the left.

I claim:

1. In a power steering valve adapted for connection with a hydraulic power cylinder in which a piston operates and with high and low pressure sources, which valve includes a sleeve and a core which fits closely within the sleeve and is axially shiftable relative to the sleeve; said sleeve being provided with an inwardly opening annular channel for connection with the high pressure source, with cylindrical lands at the sides of said high pressure channel, and with inwardly opening annular channels at the far sides of said lands for connection with the opposite ends of the cylinder; and said core being provided with a cylindrical land of the same diameter as the lands in the sleeve for fluid-tight shiftable association with said lands, which land is located opposite the high pressure channel in the sleeve and is of less axial extent than said channel, and with outwardly opening annular channels at the sides of said land, which channels are located opposite the cylinder-connected channels in the sleeve and are of greater axial extent than the lands in the sleeve; said core being also provided beyond the ends of the sleeve with radially extending disks having faces which confront the end faces of the sleeve and form therebetween annular passages, which passages are connected respectively with the annular channels in the core and are both connected with the low pressure source, said disks having annular ribs which project toward the ends of the sleeve.

2. In a power steering valve adapted for connection with a hydraulic power cylinder in which a piston operates and with high and low pressure sources, which valve includes a sleeve and a core which fits closely within the sleeve and is axially shiftable relative to the sleeve; said sleeve being provided with an inwardly opening annular channel for connection with the high pressure source, with cylindrical lands at the sides of said high pressure channel, and with inwardly opening annular channels at the far sides of said lands for connection with the opposite ends of the cylinder; and said core being provided with a cylindrical land of the same diameter as the lands in the sleeve for fluid-tight shiftable association with said lands, which land is located opposite the high pressure channel in the sleeve and is of less axial extent than said channel, and with outwardly opening annular channels at the sides of said land, which channels are located opposite the cylinder-connected channels in the sleeve and are of greater axial extent than the lands in the sleeve; said core being also provided beyond the ends of the sleeve with radially extending disks having faces which confront the end faces of the sleeve and form therebetween annular passages, which passages are connected respectively with the annular channels in the core and are both connected with the low pressure source, said disks having annular ribs which project toward the ends of the sleeve, which ribs are of different inside diameters.

3. In a power steering valve adapted for connection with a hydraulic power cylinder in which a piston operates and with high and low pressure sources, which valve includes a sleeve and a core which fits closely within the sleeve and is axially shiftable relative to the sleeve, complementary port means in the valve between the sleeve and the core, which port means in the neutral position of the valve are operable to place both ends of the cylinder in communication at the same time with both the high and low pressure sources, said port means being operable when the core is shifted in either direction to place one end only of the cylinder in communication with the high pressure source and the other end in communication with the low pressure source, and said port means including two pairs of axially confronting valvate formations on the core and sleeve, said formations in each pair providing between the same a passage which communicates with the low pressure source, the formations in one of said pairs being movable toward each other when the core is shifted in one direction to progressively restrict communication between the low pressure source and that end of the cylinder which is then being placed in enlarged communication with the high pressure source, and the formations in the other of said pairs being at the same time movable away from each other to progressively enlarge communication between the low pressure source and the other end of the cylinder, each pair of said formations consisting of one end of the sleeve and a self-aligning disk which is tiltably mounted on the corresponding end of the core is sealed engagement with the latter.

4. In a power steering valve adapted for connection with a hydraulic power cylinder in which a piston operates and with high and low pressure sources, which valve includes a sleeve and a core with fits closely within the sleeve and is axially shiftable relative to the sleeve, complementary port means in the valve between the sleeve and the core, which port means in the neutral position of the valve are operable to place both ends of the cylinder in communication at the same time with both the high and low pressure sources, said port means being operable when the core is shifted in either direction to place one end only of the cylinder in communication with the high pressure source and the other end in communication with the low pressure source, and said port means including two pairs of axially confronting valvate formations on the core and sleeve, said formations in each pair providing between the same a passage which communicates with the low pressure source, the formations in one of said pairs being movable toward each other when the core is shifted in one direction to progressively restrict communication between the low pressure source and that end of the cylinder which is then being placed in enlarged communication with the high pressure source, and the formations in the other of said pairs being at the same time movable away from each other to progressively enlarge communication between the low pressure source and the other end of the cylinder, each pair of said formations consisting of one end of the sleeve and a self-aligning disk which is tiltably mounted on the corresponding end of the core in sealed engagement with the latter and the faces of said disks confronting the ends of the sleeve being provided with annular pockets surrounded by annular ribs, which ribs project toward the ends of the sleeve.

5. In a power steering valve adapted for connection with a hydraulic power cylinder in which a piston operates and with high and low pressure sources, which valve includes a sleeve and a core which fits closely within the sleeve and is axially shiftable relative to the sleeve, complementary port means in the valve between the sleeve and the core, which port means in the neutral position of the valve are operable to place both ends of the cylinder in communication at the same time with both the high and low pressure sources, said port means being operable when the core is shifted in either direction to place one end only of the cylinder in communication with the high pressure source and the other end in communication with the low pressure source, and said port means including two pairs of axially confronting valvate formations on the core and sleeve, said formations in each pair providing between the same a passage which communicates with the low pressure source, the formations in one of said pairs being movable toward each other when the core is shifted in one direction to progressively restrict communication between the low pressure source and that end of the cylinder which is then being placed in enlarged communication with the high pressure source, and the formations in the other of said pairs being at the same time movable away from each other to progressively enlarge communication between the low pressure source and the other end of the cylinder, each pair of said formations consisting of one end of the sleeve and a self-aligning disk which is tiltably mounted on the corresponding end of the core in sealed engagement with the latter, the faces of said disks confronting the ends of the sleeve being provided with annular pockets surrounded by annular ribs, which ribs project toward the ends of the sleeve, and the pocket and rib on one of said disks being of larger size than the pocket and rib on the other disk.

6. In a power steering valve adapted for connection with a hydraulic power cylinder in which a piston operates and with high and low pressure sources, which valve includes a sleeve and a core which fits closely within the sleeve and is axially shiftable relative to the sleeve; said sleeve being provided with an inwardly opening annular channel for connection with the high pressure source, with cylindrical lands at the sides of said high pressure channel, and with inwardly opening annular channels at the far sides of said lands for connection with the opposite ends of the cylinder; and said core being provided with a cylindrical land of the same diameter as the lands in the sleeve for fluid-tight shiftable association with said lands, which land is located opposite the high pressure channel in the sleeve and is of less axial extent than said channel, and with outwardly opening annular channels at the sides of said land, which channels are located opposite the cylinder-connected channels in the sleeve and are of greater axial extent than the lands in the sleeve; said core being also provided beyond the ends of the sleeve with radially extending disks having faces which confront the end faces of the sleeve and form therebetween annular passages, which passages are connected respectively with the annular channels in the core and are both connected with the low pressure source, and guide means between the ends of the sleeve and the ends of the core at the far sides of said outwardly opening channels in the core between the latter and said disks for maintaining the core coaxial with the sleeve in all positions of the core.

7. In a power steering valve adapted for connection with a hydraulic power cylinder in which a piston operates and with high and low pressure sources, which valve includes a casing, a sleeve which is mounted in the casing, and a core which fits closely within the sleeve and is axially shiftable relative to the sleeve; said sleeve being provided with an inwardly opening annular channel for connection with the high pressure source, with cylindrical lands at the sides of said high pressure channel, and with inwardly opening annular channels at the far sides of said lands for connection with the opposite ends of the cylinder; and said core being provided with a cylindrical land of the same diameter as the lands in the sleeve for fluid-tight shiftable association with said lands, which land is located opposite the high pressure channel in the sleeve and is of less axial extent than said channel, and with outwardly opening annular channels at the sides of said land, which channels are located opposite the cylinder-connected channels in the sleeve and are of greater axial extent than the lands in the sleeve; said core being also provided beyond the ends of the sleeve with radially extending disks having faces which confront the end faces of the sleeve and form therebetween annular passages, which passages are connected respectively with the annular channels in the core and are both connected with the low pressure source, said disks on the core extending radially outward beyond the sleeve, and spring means acting between the casing and the outwardly extending portions of said disks for yieldingly resisting axial movement of the core relative to the sleeve in either direction.

8. In a power steering valve adapted for connection with a hydraulic power cylinder in which a piston operates and with high and low pressure sources, which valve includes a sleeve and a core which fits closely within the sleeve and is axially shiftable relative to the sleeve; said sleeve being provided with axially spaced inwardly opening annular channels for connection with the high pressure source, with cylindrical lands at the sides of and between said high pressure channels, with other axially spaced inwardly opening annular channels at the sides of and between said lands for connection with the opposite ends of the cylinder, with other lands at the other sides of and between said cylinder-connected channels, and with another inwardly opening annular channel between the last mentioned lands for connection with the low pressure source; and said core being provided with axially spaced cylindrical lands of the same diameter as the first mentioned lands in the sleeve, which lands in the core are spaced more widely apart than the first mentioned lands for sealing coaction with the latter when the core is shifted axially, and said core being also provided with a flange between the lands in the latter, which flange is of less axial extent than the low pressure channel in the sleeve and projects radially into that channel for constrictive coaction with one side or the other of the channel depending on the direction in which the core is shifted.

9. In a power steering valve adapted for connection with a hydraulic power cylinder in which a piston operates and with high and low pressure sources, which valve includes a sleeve and a core which fits closely within the sleeve and is axially shiftable relative to the sleeve; said sleeve being provided with axially spaced inwardly opening annular channels for connection with the high pressure source, with cylindrical lands at the sides of and between said high pressure channels, with other axially spaced inwardly opening annular channels at the sides of and between said lands for connection with the opposite ends of the cylinder, with other lands at the other sides of and between said cylinder-connected channels, and with another inwardly opening annular channel between the last mentioned lands for connection with the low pressure source; and said core being provided with axially spaced cylindrical lands of the same diameter as the first mentioned lands in the sleeve, which lands in the core are spaced more widely apart than the first mentioned lands for sealing coaction with the latter when the core is shifted axially, and said core being also provided with a flange between the lands in the latter, which flange is of less axial extent than the low pressure channel in the sleeve and projects radially into that channel for constrictive coaction with one side or the other of the channel depending on the direction in which the core is shifted; and said flange having oppositely facing outer edge portions of different effective diameters.

References Cited in the file of this patent

UNITED STATES PATENTS

| | | |
|---|---|---|
| 2,063,937 | Kundig | Dec. 15, 1936 |
| 2,370,137 | Biggert | Feb. 27, 1945 |
| 2,380,705 | Proctor | July 31, 1945 |
| 2,410,049 | Davis | Oct. 29, 1946 |
| 2,432,721 | Brown | Dec. 16, 1947 |
| 2,679,234 | Robinson | May 25, 1954 |
| 2,681,045 | Klessig et al. | June 15, 1954 |
| 2,702,529 | Doerfner | Feb. 22, 1955 |
| 2,739,613 | Kulikoff | Mar. 27, 1956 |